United States Patent
Gardner et al.

(12)

(10) Patent No.: US 6,229,453 B1
(45) Date of Patent: *May 8, 2001

(54) METHOD TO TRANSMIT DOWNHOLE VIDEO UP STANDARD WIRELINE CABLE USING DIGITAL DATA COMPRESSION TECHNIQUES

(75) Inventors: Wallace R. Gardner; Steven D. Maddox, both of Houston, TX (US)

(73) Assignee: Halliburton Energy Services, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,373

(22) Filed: Jan. 26, 1998

(51) Int. Cl.[7] ............................................. G01V 3/00

(52) U.S. Cl. .............................. 340/853.8; 340/854.7; 340/854.9; 367/68; 348/85

(58) Field of Search .................... 340/854.9, 856.3, 340/854.7, 855.6, 856.4; 348/85; 367/81, 68

(56) References Cited

U.S. PATENT DOCUMENTS

| | | | |
|---|---|---|---|
| 3,865,201 | * | 2/1975 | Haden .................................. 166/250 |
| 3,974,330 | * | 8/1976 | Askowith et al. ...................... 348/85 |
| 5,134,471 | * | 7/1992 | Gerdron et al. ......................... 367/69 |
| 5,485,745 | * | 1/1996 | Rademaker et al. ............... 340/854.9 |
| 5,493,626 | | 2/1996 | Schultz et al. ......................... 385/101 |
| 5,663,559 | * | 9/1997 | Auzerais et al. .................. 250/269.1 |

OTHER PUBLICATIONS

The Wavelet tutorial, Part I, by Robi Polikar; Fundamental Concepts and an Overview of the Wavelet Theory, Second Edition, Jun. 5, 1996 no Page #'s.

The Wavelet Tutorial Part 2, by Robi Polikar; Fundamentals: The Fourier Transform and The Short Term Fourier Transform, May 30, 1996 no Page #'s.

The Wavelet Tutorial Part III, by Robi Polikar, Multiresolution Analysis and The continuous Wavelet Transform, Jun. 5, 1996 no Page #'s.

Wavelet Based Bideo Codecs no Page Nos.

An Introduction to Wavelets, Amara Graps, 1995, Institute of Electrical and Electronics Engineers, Inc. pp. 1–18.

\* cited by examiner

*Primary Examiner*—Michael Horabik
*Assistant Examiner*—Timothy Edwards, Jr.
(74) *Attorney, Agent, or Firm*—Conley, Rose & Tayon, P.C.

(57) ABSTRACT

Disclosed is a downhole video system that is suitable for use with a standard wireline transmission line, without the need for coaxial or fiber optic cable. A downhole video camera transmits a digitized video signal that may be multiplexed with orientation, sound, and other telemetry data. At the surface, an enhanced video is displayed simultaneously with processed sound to give an operator a better understanding of the conditions downhole. In addition, multiple modes are provided, including a "burst" mode to provide high resolution, full motion video, thereby circumventing the severe bandwidth limitations of standard electrical transmission lines.

21 Claims, 7 Drawing Sheets

METHOD TO TRANSMIT DOWNHOLE VIDEO UP STANDARD WIRELINE CABLE USING DIGITAL DATA COMPRESSION TECHNIQUES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to downhole video systems. More particularly, the present invention relates to a downhole video system using standard electrical transmission lines to transmit video. Most particularly, the present invention relates to a downhole video system and method for using standard electrical transmission lines to transmit video and other downhole information to the surface for an improved video depiction of conditions downhole.

Modern society depends upon the inexpensive and continued production of hydrocarbons. In view of a limited world hydrocarbon supply, keeping energy costs low requires continual improvement in well drilling technology. This quest for improved geological formation evaluation and hydrocarbon recovery requires a great quantity of information relating to parameters and conditions downhole. Such information typically includes characteristics of the earth formations traversed by the wellbore, in addition to data relating to the size and configuration of the borehole itself. The collection of information relating to conditions downhole commonly is referred to as "logging". Logging has been known in the industry for many years as a technique for providing information regarding the particular earth formation being drilled and can be performed by several methods. In conventional oil well wireline logging, a probe or "sonde" is lowered into the borehole after some or all of the well has been drilled, and is used to determine certain characteristics of the formations traversed by the borehole. Various sensors have been used to determine particular characteristics of the formation, including nuclear sensors, acoustic sensors, electrical sensors, and video cameras. The sonde typically is constructed as a hermetically sealed steel cylinder for housing the sensors, which hangs at the end of a long cable or "wireline". The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface and control signals from the surface to the sonde. In accordance with conventional techniques, various parameters of the earth's formations are measured and correlated with the position of the sonde in the borehole, as the sonde is pulled uphole.

During drilling and production, a variety of conditions downhole may impede or preclude the retrieval of hydrocarbons from a well bore. FIG. 1 illustrates a hypothetical well bore 100 and five different levels 110, 120, 130, 140, 150 of the well bore. A different condition exists at each of these levels. Gas leaks into the well bore at level A 110, nothing comes into the well bore at level B 120, oil leaks into the well bore at level C 130, water leaks into the well bore at level D 140, and an object 155 occupies the bottom level E 150 of the well bore 100. Object 155 may, for example, be a piece of equipment that has been mistakenly dropped down the well bore or has been broken.

As can be appreciated by one of ordinary skill in the well drilling arts, a particular hydrocarbon stream, such as oil, is normally sought from a particular well bore. As such, water leakage at level D 140 and gas leakage at level A 110 are not desirable and should be eliminated or minimized, if possible. If the exact depth and character of a gas or water leak can be found, known corrective measures can stop the leaks, and so it is very important to learn the depth and nature of a leak. For obstructions and lost items 155 in the well bore, known "fishing" tools and techniques can usually remove object 155 from the well bore if the object can be seen. Were object 155 left in the well bore, drilling and downhole operations would be complicated and abandonment of the well may be the only option. Because of the extremely high cost of drilling a well bore 100, it is highly preferable to remove object 155 from the well bore.

Downhole video systems have been found useful in locating and identifying the problems depicted in FIG. 1, in addition to others. For example, the video camera system can detect turbulence created by a leak and may identify different fluids leaking into the well bore. Particulate matter flowing out through a hole can be detected. Obstructions in the well bore can be seen. Formation fractures and their orientations may be detected along with damaged, parted, or collapsed tubings and casings. Corrosion surveys can also be performed. Other causes for loss of production, such as sand bridges or malfunctioning flow controls such as valves, may be identified by the downhole video.

FIG. 2 shows one such downhole video system including an instrument probe. Shown are a well logging system 200 including a borehole or well bore 210 and well instrument probe 220 hanging by a support cable 230. Support cable 230 attaches to rotatable winch 235, surface controller 240 inside enclosure 245, and transportable platform 248. Support cable 230 must be capable of extending through pressure gland 250, lubricator risers 252, and main valve 255, all part of well head 260.

FIG. 3 illustrates a well instrument probe 220 and attached support cable 230 in a well bore 210. Also shown are cable head 240, camera head 250, light head 260, and legs 270 attaching lighthead 260 to camera head 250. The instrument probe 220 contains the remote video camera and other electrical equipment, and connects to the surface by an electrical instrument cable 230, thereby permitting transmission of electrical power to the video camera and communication of data from the video camera to the surface equipment.

Borehole 210 often is about 21.5 cm (8.5 in) in diameter, but many wells are relatively small in diameter, on the order of 4.5 cm (1.75 in). Consequently, the instrument probe and its cable designated for use in such a well are limited in their respective diameters. This can lead to practical problems when a high pressure well is involved. The well shown in FIG. 2 is capped to prevent the uncontrolled escape of high pressure well fluids. In order to insert a downhole video instrument into such a well, the video instrument must be forced into the well through the cap. As is well known in the art, small instruments are easier to insert into a high pressure environment because they present less surface area against which the high pressure well fluids can act. Thus, small differences in the diameters of downhole instrument cables can have a tremendous impact on the ease and expense of inserting the cable and an attached instrument into the well. However, small diameter transmission lines typically have severe bandwidth limitations. The prior art attempts to obtain adequate bandwidth between the downhole camera and a surface video monitor by employing co-axial cable or fiber optic cable. However, each of these solutions comes with severe drawbacks.

One drawback of coaxial cable for video transmission is the necessity of a progressively larger coaxial cable for longer well bores. Because the minimization of cable size is highly preferable, thick coaxial cable is not an ideal solution for downhole video transmission. And while fiber optic transmission lines have an adequately small diameter, they are very expensive and have a tendency to break under the severe stresses downhole. Ideally, neither coaxial nor fiber optic transmission lines would be necessary. Instead, the standard electrical transmission lines could be used to obtain satisfactory video at a surface location.

FIG. 4 illustrates a standard electrical transmission and support line used for and connected to a well instrument probe 220. Such a standard electrical transmission line is conventionally about 0.55 centimeters wide. Transmission line 400 includes a copper conductor 410 at the center of insulation 420 and first and second armored layers 430, 440 of strength member strands wound helicaly around the outer insular jacket in opposite directions. Prior art electrical transmission lines such as that shown have adequate diameter profiles, but lack the bandwidth required for video transmission. Presently, the data transmission rate of these lines is about 34 kilobytes per second, with envisioned rates of 200 kilobytes per second being achieved in the foreseeable future. Nonetheless, this is extremely slow in view of the fact that a minute of downhole video may occupy 50 megabytes of memory.

FIG. 5 illustrates a prior art video transmission system. The surface of the earth 550 divides the system into both subterranean components 500 and above-surface components 560. Included below-ground are downhole video camera 510 and analog cable transmitter circuits 520. A transmission line 525 carries data from analog cable transmitter circuits 520 to analog cable receiver circuits 530. TV monitor 540 attaches to analog cable receiver circuits 530 and displays the video received from downhole. Analog devices are used because heretofore analog transmission was the most effective way of transmitting video uphole.

Therefore, a downhole video system is needed that can use the standard electrical transmission line for video communication with surface components, without the need for coaxial or fiber optic transmission lines. Ideally, this invention would provide an easily interpretable indication of the conditions downhole. Such an invention preferably could be implemented with only minimal additional equipment downhole.

SUMMARY OF THE INVENTION

The present invention generally corresponds to a downhole video system including a video camera capable of generating a digitized signal representative of images downhole, a transmission line attached to the video camera for carrying the digitized signal and a digital video compressor for eliminating redundant or superfluous data residing in the digitized signal. Preferably, this system can use a standard electrical transmission line. The preferred embodiment also includes an orientation sensor configured to generate a data signal containing orientation information, a downhole sound sensor for generating a data signal containing sound information, and other downhole telemetry sensors conventionally included in wireline logging, these conventional telemetry sensors generating other data signals representative of conditions downhole. All of these data signals are preferably multiplexed together and sent uphole. After demultiplexing, the digitized video signal is processed by edge detection, contrast enhancement including colors, and other image processing techniques to emphasize certain features. Orientation information is preferably used to continuously rotate the video image so that it maintains a constant perspective. Sound information, if transmitted uphole, is broadcast from a speaker and, analogous to video data, can be processed to emphasize certain sounds existing downhole. Normally, the sounds are generated continuously from the speaker without interruption so that a surface operator is constantly provided an indication of the sounds and corresponding conditions downhole.

The preferred embodiment also includes multiple modes. In a first mode, surface controllers available to an operator may be manipulated to establish an optimal balance of compression ratio, frame rate, and picture size. A second mode, referred to as a "burst" mode, provides a surface operator a short "burst" of high quality video and sound. This mode can be used when it is particularly important to obtain the most accurate depiction of the conditions downhole.

The present invention is also a method for transmitting downhole video data to the surface using standard electrical transmission lines. The method includes the steps of Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 4:
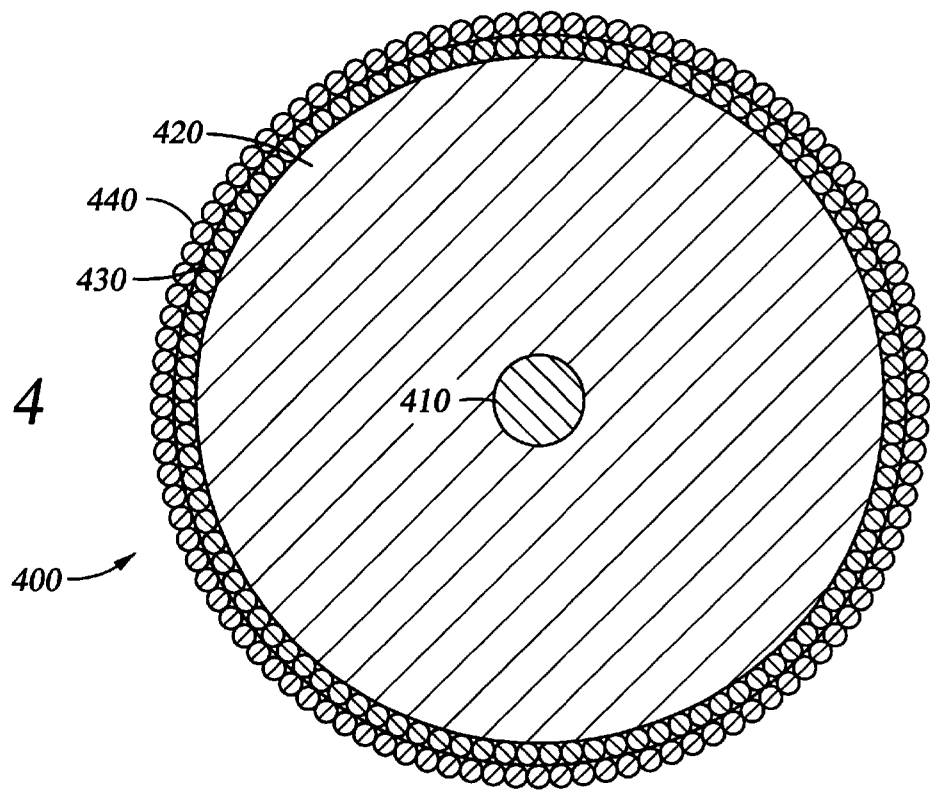
FIG. 4 illustrates a standard electrical transmission line.
Figure 6A:
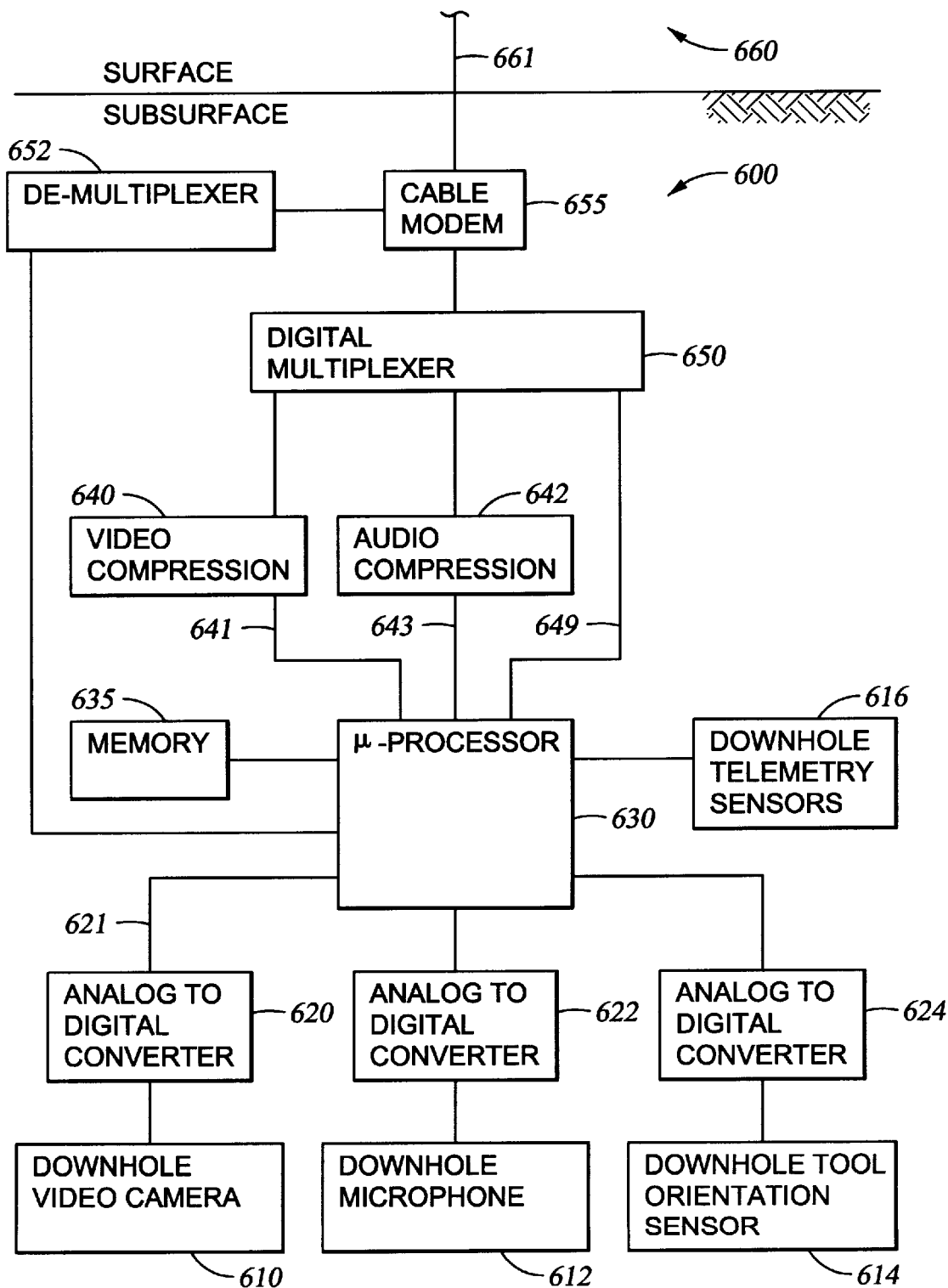
FIG. 6A is a block diagram of one embodiment of the subsurface components of the present invention.
Figure 6B:
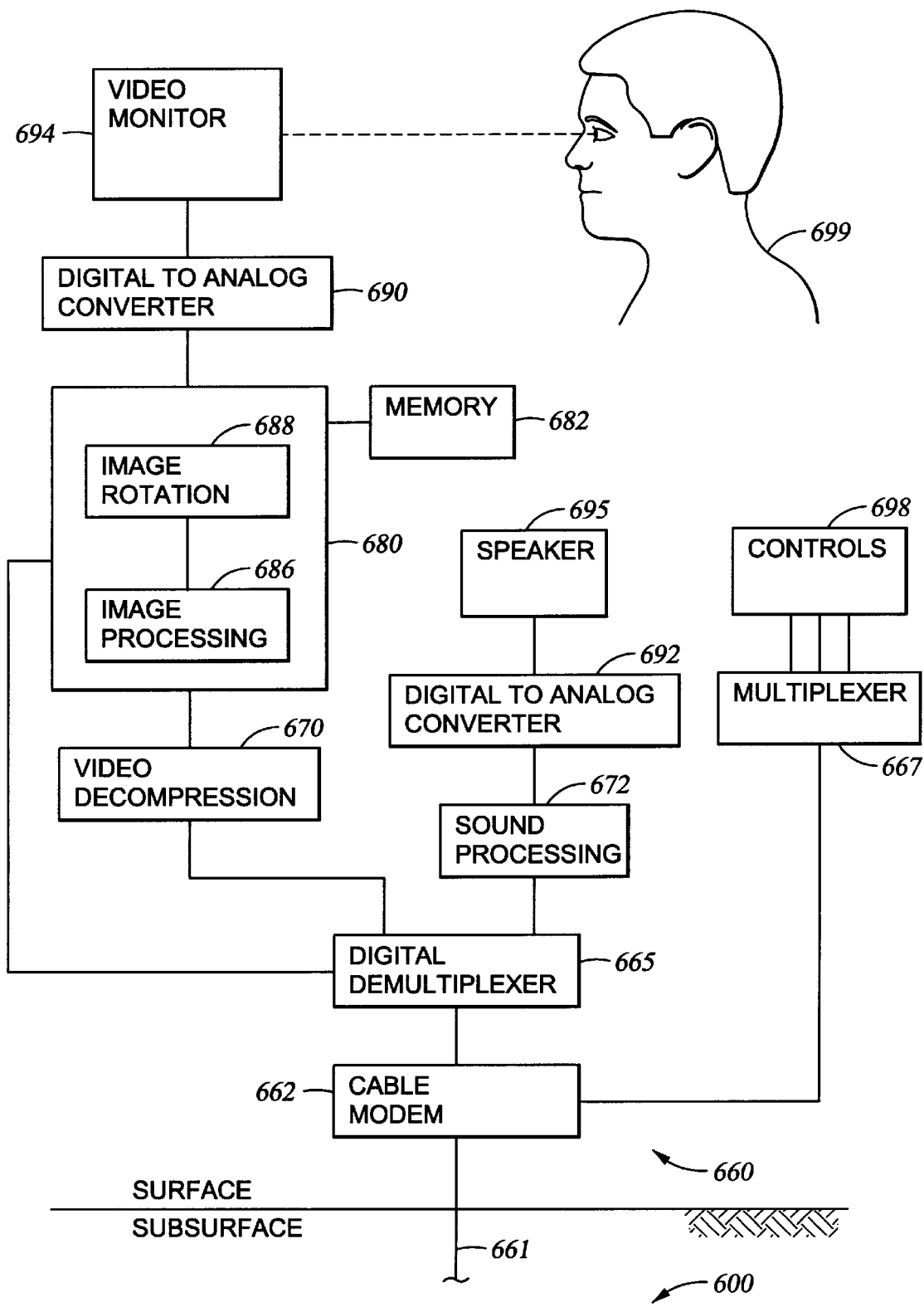
FIG. 6B is a block diagram of one embodiment of the above-surface components of the present invention.

Referring now to FIGS. 6A and 6B, the preferred embodiment includes a subsurface portion 600, and a surface portion 660. Subsurface portion 600, shown in FIG. 6A, includes a downhole video camera 610, a downhole microphone 612, and a downhole tool orientation sensor 614, each of these attached to a respective analog-to-digital ("ADC") converter 620, 622, 624. Although ADC 620 is shown separate from video camera 610, downhole video camera 610 and ADC 620 may be an integral whole such that downhole video camera 610 generates a digitized signal along line 621. Similarly, other analog components may be combined with an ADC or the like. Microprocessor 630 connects from each analog-to-digital converter 620, 622, 624. Microprocessor 630 also connects to associated memory 635, downhole telemetry sensors 616, and cable modem transceiver 655 via de-multiplexer 652. Video compression chip 640, audio compression chip 642, and digital multiplexer 650 connect from microprocessor 630. Digital multiplexer 650 also attaches to cable modem 655. Cable modem 655 acts as a transceiver and connects via electrical line 661 to equipment in the surface section 660. Cable 661 may be any appropriate type of transmission line, but is particularly envisioned as a standard electrical support cable for wireline environments as shown in FIG. 4.

FIG. 6B illustrates the surface components 660 of the present invention. Shown are cable modem transceiver 662 attached to electrical line 661, digital de-multiplexer 665, video decompression chip 670, and sound processing chip 672. Also shown is microprocessor 680 including an image processing section 686 and an image rotation section 688. Attached to microprocessor 680 is associated memory 682. Microprocessor 680 connects to video monitor 694 through digital-to-analog converter ("DAC") 690. Sound processing chip 672 connects to speaker 695 through DAC 692. Also shown are up-hole controls 698 and multiplexer 667, provided to allow an operator 699 to adjust various parameters of subsurface components 600.

Referring now to both FIGS. 6A and 6B, elements 610, 612, and 614 each collect information pertaining to conditions downhole. Video camera 610 records video image data, while microphone 612 detects sounds and converts them to electrical signals. As used herein, the term "sound" refers to acoustic frequencies different than those typically used by acoustic logging devices, with "sound" frequencies being perceivable by the human ear. Downhole orientation sensor 614 records the azimuth and deviation from zenith of the video camera 610. After being digitized by the corresponding ADC 620, 622, or 624, the information from tools 610, 612, and 614 is sent to micro-processor 630. Downhole telemetry sensors 616 also send digitized data to microprocessor 630. At this time, the received information may be stored by micro-processor 630 in an uncompressed form in memory 635. Alternately, micro-processor 630 may store video data and sound data in memory 635 after suitable compression. If the video images are compressed before being stored in memory 635, they generally would be compressed at a lower compression ratio than that used for the immediate transmission of images to the surface. This allows later, more accurate study of the downhole video, if necessary. In any event, micro-processor 630 then transmits the orientation data and telemetry sensor data directly to multiplexer 650 via line 649, transmits the video data to video compression chip 640 via line 641, and transmits sound data to audio compression chip 642 via line 643. Video compression chip 640 then provides a compressed video signal to multiplexer 650 and audio compression chip 642 provides a compressed audio signal to multiplexer 650. Multiplexer 650 then provides to cable modem 655 a multiplexed signal including video, sound, orientation information, and other data from sensors 616 indicative of characteristics downhole. Alternately, the video and audio signals may be combined prior to compression. Cable modem 655 transmits this digitized information signal including video data along cable 661 to surface components 660.

Figure 5:
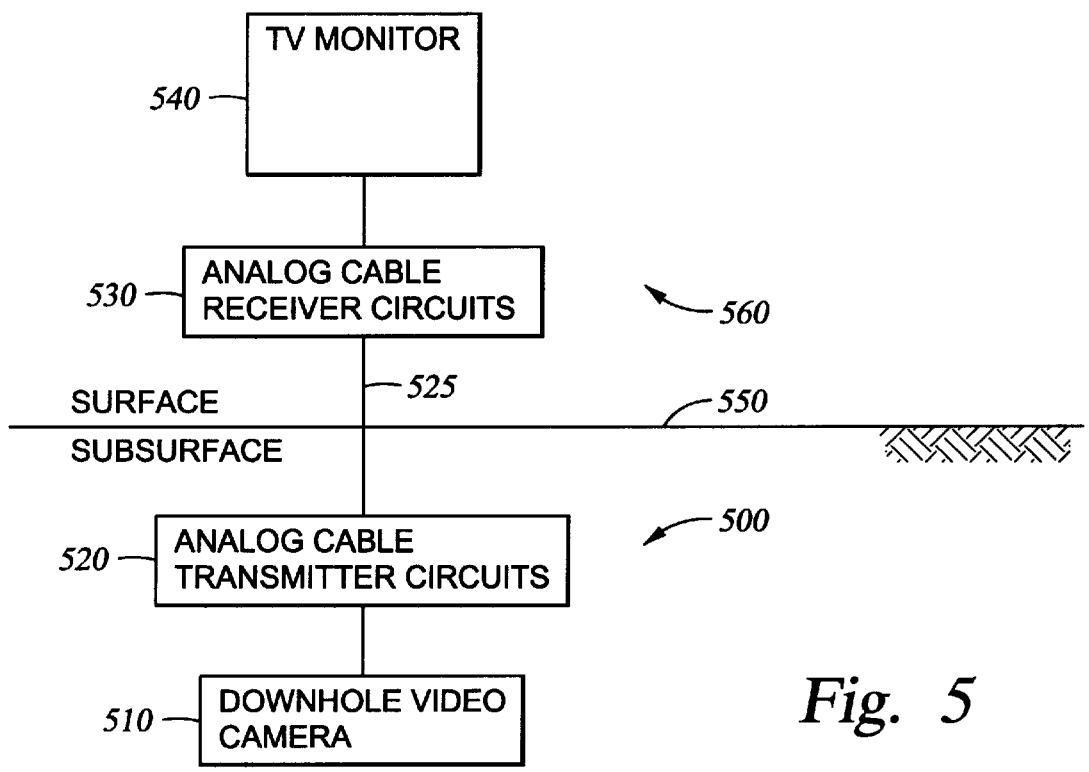
FIG. 5 illustrates a downhole analog video system.

Prior to the present invention, video signals were sent from downhole video cameras by means of analog signals, as shown in FIG. 5. Analog signals were used because the transmission of an analog video signal occupied less band width than its uncompressed digital counterpart. In contrast, the present invention employs a video compression chip 640 to facilitate digital transmission. Video decompression chip 640 may appropriately be an analog devices ADV 601 chip. Preferably, compression chip 640 uses a digital compression protocol utilizing wavelet theory. Nonetheless, as would be appreciated by one of ordinary skill in the art, MPEG and other types of compression techniques may also be employed. The video signal is decompressed uphole by video decompression chip 670.

Figure 8:
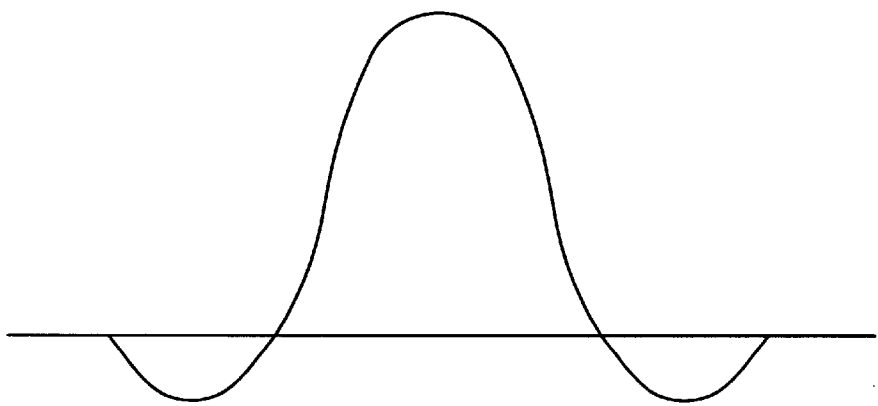
FIG. 8 is an exemplary waveform used by wavelet compression.

The wavelet compression technique is a lossy compression technique. It involves the selection of a particular wavelet form based on the signal being analyzed. FIG. 8 shows one possible wavelet form that may be chosen. Proper scaling (i.e., stretching or shrinking) and time-shifting of the wavelet form approximates a portion of the transmission signal. A coefficient indicates how well the manipulated wavelet form corresponds to the original signal. Repeated selection of wavelet forms, scaling, and time shifting yields a series of wavelets that approximate the transmission signal. The series of wavelets are then compressed by suitable mathematical transformation. This transformation yields an array of energy coefficients. Deletion of mathematical coefficients with little or no energy, as is universal for lossy compression techniques, prevents the transmission of redundant or superfluous data. The compression ratio varies in accordance with the number of coefficients that are deleted after transformation and before transmission. The more substantial the deletion, the higher the compression ratio, and the lower the reconstructed picture quality.

As explained above, prior attempts to use the cable transmission line as the carrier for a video transmission signal have failed because of severe band width limitations. These limitations are exacerbated by the preference to transmit simultaneous with the video data additional information indicative of conditions downhole. While this complication is not completely solved by the teachings herein, the present invention uses these other information signals to create a synergistic video presentation for simplified viewing of the video, as explained below. Nonetheless, in view of these bandwidth constraints, certain trade-offs must be made by an operator 699 of the present invention.

For example, one limiting criterion is the frames-per-second or seconds-per-frame rate at which the downhole information is transmitted. Over time, a slower video frame rate requires less data to be transmitted up-hole than a faster video frame rate, but the video received at the surface becomes progressively more jerky as the video frame rate slows. A frame rate of 30 frames per second is standard on most television screens, while a rate of 24.9 frames per second is seen at a movie theater. Transmission speeds as low as twenty frames per second are indistinguishable to the human eye from the full motion video seen on a television or in a movie theater. Fifteen frames per second is an acceptable speed to a human observer, and includes a minimal degree of jerkiness. Using prior art techniques, the frames displayed uphole would change at a rate of about 1 frame every 9 seconds.

Another criterion important in downhole video transmission is the compression ratio. A 1:1 compression ratio indicates that no compression has taken place and that all the information contained in the video signal is transmitted uphole. Progressively higher compression ratios require less data to be sent uphole, but with a concomitant degradation of video picture quality. Nonetheless, a minimal amount of video compression results in a picture that includes no perceivable difference from an uncompressed video picture. For wavelet technology, a compression ratio of 30:1 is indistinguishable from an uncompressed signal to the human eye, while a compression ratio of 60:1 has minimal degradation of the video signal.

Another criterion that affects the amount of data that must be sent uphole is picture size. The larger the picture size (i.e., the greater the number of pixels), the more information is required per frame of video. As such, a smaller picture size may be utilized to minimize the amount of data necessarily transmitted uphole, but limits the viewing area. The present invention provides surface controls 698 that allow an uphole observer to adjust frame rate, compression ratio, and picture size and thereby adjust the video displayed on video monitor 694. Controls 698 generate data signals that are transmitted to multiplexer 667 and cable modem 662. After transmission and receipt downhole by modem 655 and demultiplexer 652, microprocessor 630 executes the desired adjustments.

The optimal balancing of these criteria depends, in part, on the speed at which the video camera is lowered into the borehole. As can be appreciated by one of ordinary skill in the art, a faster rate of descent makes more difficult the recognition and identification of problems downhole. One approach for solving this, for instance, is to use a high data compression ratio such as 100:1 or higher, thus allowing an operator to perceive crudely what is occurring downhole until some area of interest is seen or otherwise indicated. At that time, an operator may retrace his path for some distance, slow the speed of descent for the downhole video camera, and increase the resolution of the video image as desired.

After cable modem 662 receives the multiplexed signal, it provides it to digital demultiplexer 665, which separates it into its component parts. Sound data is provided to sound processor 672. Video data is supplied to video decompression chip 670 and subsequently to processor 680. Tool orientation and other telemetry data is provided directly to processor 680. After respective processing 672, 686, 688 and transformation 692, 690 to an analog form, speaker 695 generates sounds indicative of downhole conditions, and video monitor 694 displays the reconstructed video images.

One particularly useful telemetry signal for the present invention is a downhole tool orientation sensor 614 that indicates the azimuth and deviation from zenith of the well bore. Such information may be displayed on video monitor 694, but preferably is provided to microprocessor 680 so that it may execute image rotation 688 before the video signal is displayed on video monitor 694. Further, this information may be displayed on video monitor 694 or the like to assist a viewer or surface operator in analyzing the inclination and orientation of the well bore.

Downhole telemetry sensors 616 may be various well-known drilling and position sensors, and information therefrom may be recorded to create drilling logs, as is known in the prior art. In addition, signals from the downhole telemetry sensors 616 may be used by microprocessor 680 in its image processing portion 686. Image processing portion 686 of microprocessor 680 conditions and manipulates the video signal to simplify viewing by a surface observer. By integrating information from downhole telemetry sensors 616 into the image processing portion of microprocessor 680, particular aspects or images of the video may be highlighted and thereby made obvious to the uphole observer. For example, edge detection, contrast enhancement with colors, and other video techniques may be utilized to provide a clearer, more easily understood video signal to an observer 699. Microprocessor 680 may also be programmed to recognize and emphasize particular shapes or images. As such, downhole video according to the present invention will be utilized more effectively because the downhole information signals from telemetry sensors 616 will not simply be placed on a log, but instead will also be placed on the video screen for immediate and simplified interpretation. Alternately, the video data may be redisplayed by mathematically projecting the data as by texture mapping a surface such as a plane or a cylinder. Advantageously, this image processing approach does not require any additional bandwidth or downhole equipment. In addition, the image processing 686 is simplified because the information is transmitted along cable 661 from subsurface components 600 in a digital format.

Figure 1:
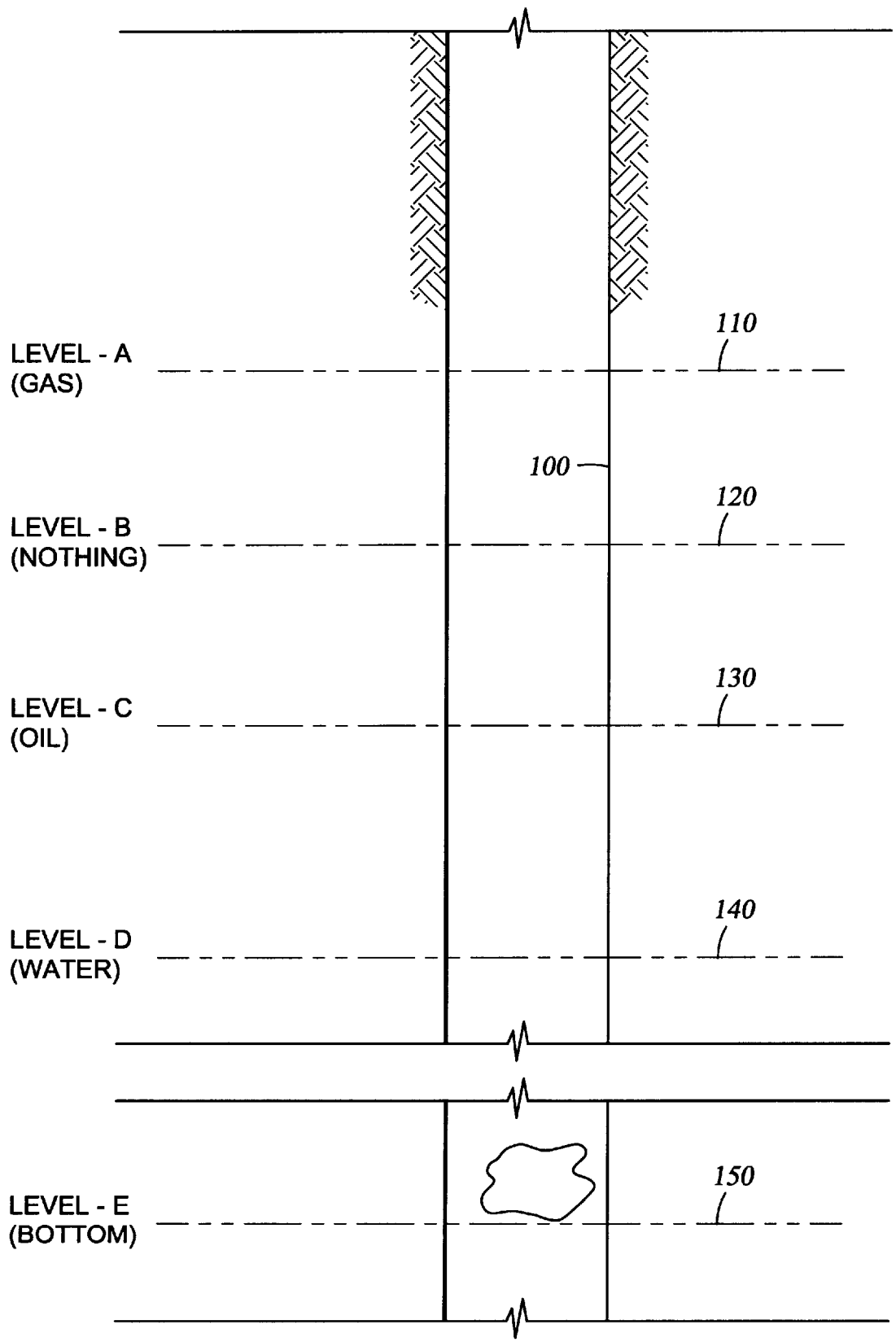
FIG. 1 illustrates a hypothetical borehole.
Figure 2:
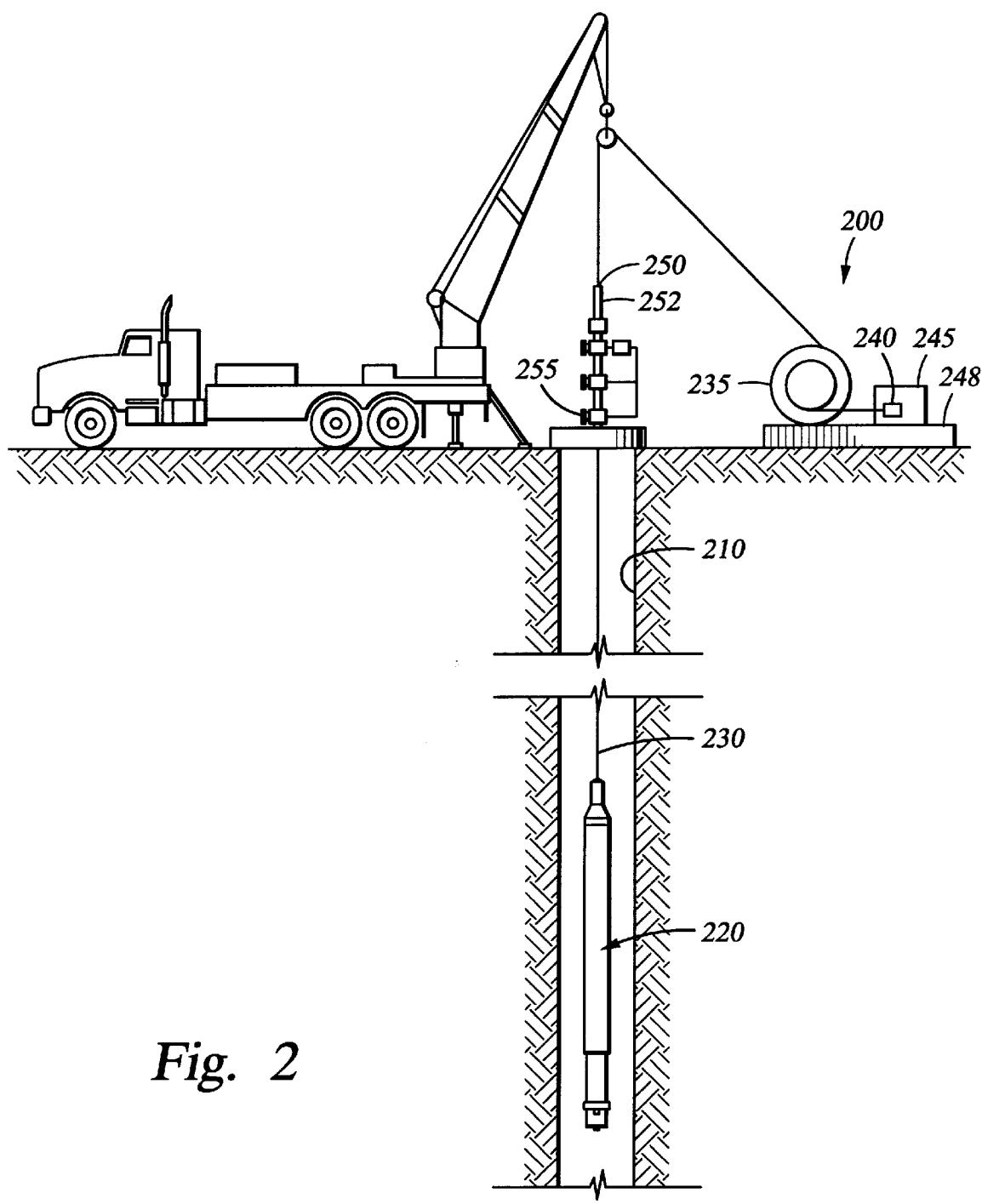
FIG. 2 illustrates a downhole video system.
Figure 3:
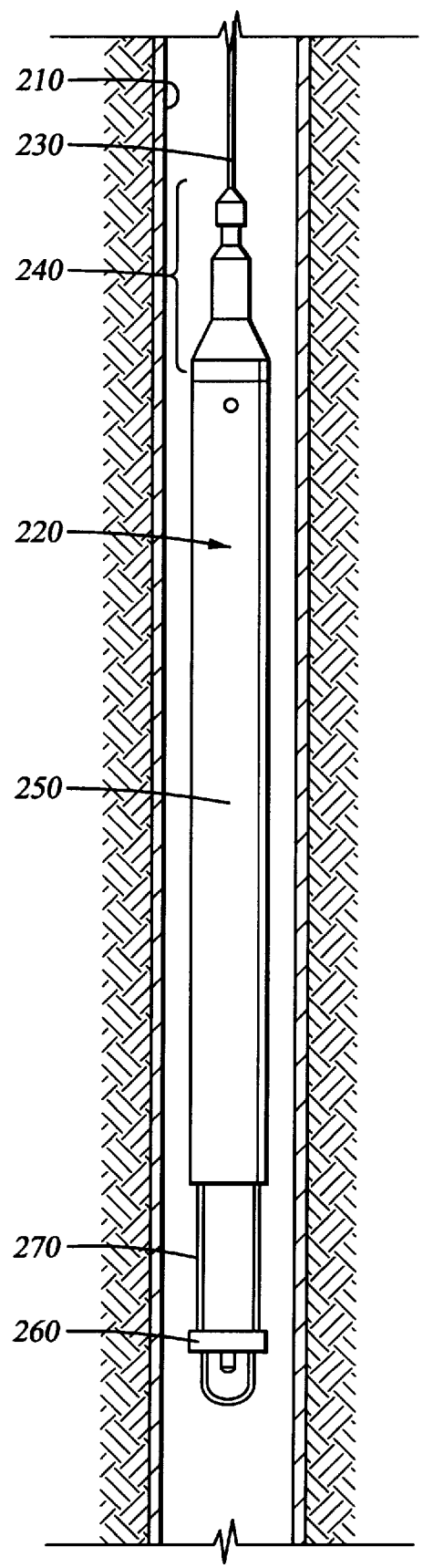
FIG. 3 illustrates a downhole video well instrument.

Furthermore, downhole microphone 612 records downhole sounds. Because downhole sound information occupies significantly less bandwidth than video information, it is possible for downhole sounds to be presented real-time to a surface observer. Real-time monitoring of downhole sounds assists in solving many of the problems described in reference to FIG. 1. For example, gas and water leaks make signature sounds that can be detected and identified by an experienced uphole observer or processor. Sound processing 672 may be utilized to emphasize certain sounds emitted from speaker 695, similar to the way in which the video image is enhanced to highlight certain features. As such, a surface operator handicapped by a lower than ideal combination of picture size, compression ratio, and video frame rate may use the sounds generated by the present invention to focus on certain areas of the well bore. Particular sounds may indicate that the downhole video camera is near a problem area and thus should be raised, slowed in its descent, or otherwise adjusted. Thus, the preferred embodiment's use of sounds detectable by the human ear dramatically enhances the efficacy of downhole video, particularly when bandwidth limitations are present.

To alleviate further the difficulties associated with a limited bandwidth, the present invention also includes multiple modes of operation. In addition to the mode described above, wherein operator 699 can use controls 698 to find an optimum balance of frame rate, compression ratio, and picture size, a "burst" mode is included. This mode circumvents the problem of insufficient band width that makes infeasible the viewing of high resolution, full motion video at the surface. In the "burst" mode, the viewer would see a burst or episode of high resolution, full motion video after a pause wherein video footage is not presented to the video monitor. Downhole, microprocessor 630 sends a particular "burst" of full motion video, for example, one minute of full motion video, over the course of an extended period. The amount of time necessary to transmit this full motion video naturally would depend upon the resolution and picture size desired by the operator, but a 1:10 time ratio might be typical such that one minute of high quality video might be transmitted over a ten minute period. On the video display, a full minute of full motion video would therefore follow a nine or ten minute pause. As such, the present invention allows the full motion video viewing of problem areas downhole at a high resolution, despite the absence of coax cables or fiber optics.

Figure 7:
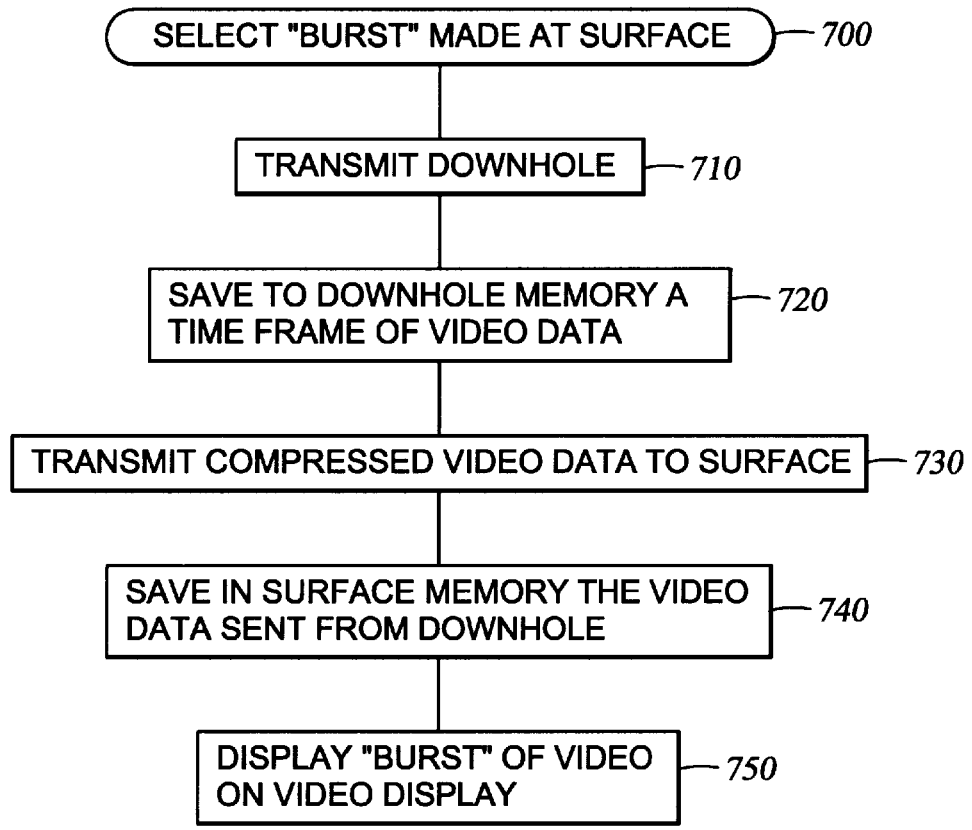
FIG. 7 is a flow diagram of the "burst" mode.

The "burst" mode operates in accordance with the steps of FIG. 7. The "burst" mode is selected by an operator at step 700. A corresponding command signal is sent to downhole microprocessor 630 at step 710. At step 720, microprocessor 630 stores in memory 635 the video images constantly transmitted to microprocessor 630 by downhole video camera 610. Depending upon the capacity of memory 635, the stored video may be uncompressed digital video, or may be compressed by video compressor 640. The images transmitted from downhole are provided to microprocessor 680 and are saved in memory 682 at step 740. Finally, when a sufficient amount of data has been received uphole, a "burst" of video is shown on video monitor 694. Sound corresponding to the delayed burst of video is preferably broadcast so that the operator is provided an exceptionally accurate portrayal of conditions and activities downhole. This approach is particularly applicable when a series of spaced "problem areas" are downhole and their locations are approximately known.

An additional mode is a hybrid mode, wherein the video monitor would have a "focus" portion displayed on the video monitor. As such, the video monitor would display different regions, with each region presenting video that has been compressed at different compression ratios. Thus, the "focus" area or areas would have a higher resolution than other regions on the video screen. Such a "focus" mode would provide high quality video for areas of particular interest, yet still maintain an adequate picture size and frame rate.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A video system for use in a well bore, comprising:
    a video camera suitable for insertion in a well bore, said video camera capable of generating a digitized signal representative of downhole images;
    a sound sensor suitable for insertion in a weilbore and configured to detect sounds, said sound sensor capable of subsequent generation of an electrical signal representative of said detected sounds;
    a transmission line attached to said video camera and said sound sensor, said transmission line suitable for carrying said digitized signal and said electrical signal;
    a digital video compressor configured to attach to said transmission line, said video compressor being suitable for receipt of an uncompressed form of said digitized signal and further suitable for subsequent generation of a compressed form of said digitized signal, wherein said digital video compressor is programmed to utilize lossy image compression to reduce the bandwidth requirements of said digitized signal;
    a video presentation device in communication with said transmission line, said video presentation device being configured to receive a signal corresponding to said digitized signal representative of said downhole images, said video presentation device in response broadcasting a visual image;
    a speaker in communication with said transmission line, said speaker being configured to receive a signal corresponding to said electrical signal, said speaker in response broadcasting an audio presentation.

2. The video system of claim 1, wherein said digital video compressor is configured to use wavelet compression and wherein said sound sensor is a microphone.

3. The video system of claim 1, wherein said sound sensor detects ambient sounds and wherein said audio presentation corresponds to said ambient sounds.

4. The video system of claim 1, further comprising:
    a telemetry sensor suitable for insertion in a well bore and configured to generate a telemetry data signal, said telemetry sensor being attached to said digital video compressor;
    an image processor attached to said telemetry sensor and to said video camera, said image processor being programmable to alter, based upon said telemetry data signal, selected portions of said digitized signal such that upon a presentation of said digitized signal, aspects of said presentation corresponding to said selected portions are emphasized.

5. The video system of claim 4, wherein said presentation is a video presentation.

6. The video system of claim 4, wherein said presentation is a mathematical projection onto a surface.

7. The video system of claim 5, wherein said microprocessor is a means for controlling by multiple modes the transmission of downhole data to a surface location.

8. A method to transmit downhole video and sound up standard wireline cable, comprising:
    (a) positioning a video detection device and a sound detection device downhole;
    (b) generating a digitized signal corresponding to said video and sound data from said sound detection device;
    (c) compressing said digitized signal by a lossy image technique;
    (d) transmitting said digitized and compressed signal uphole;
    (e) receiving said digitized and compressed signal uphole;
    (f) decompressing said digitized and compressed signal uphole to yield a decompressed signal including said video and sound data; and
    (g) broadcasting said decompressed signal via a data presentation device.

9. The method of claim 8, wherein said step of positioning includes providing an orientation sensor downhole, said orientation sensor generating orientation data and said step of transmitting including the transmission of said orientation data.

10. The method of claim 9, further comprising:
    (g) conditioning said second digitized signal, said sound data and said orientation data by image enhancement; and
    (h) presenting for observation the resulting signal from said conditioning step.

11. The method of claim 8, further comprising:
    (g) transmitting an audio signal corresponding to said sound data from an audio presentation device.

12. The method of claim 8, further comprising:
    (g) transmitting an audio signal corresponding to said sound data from an audio presentation device and transmitting a visual signal corresponding to said digitized signal from a visual presentation device.

13. A video system for use in a well bore, comprising:
    a video camera suitable for insertion in a wellbore, said video camera capable of generating a digitized signal representative of downhole images;
    a sound sensor suitable for insertion in a well bore and configured to detect sounds, said sound sensor capable of subsequent generation of an electrical signal representative of said detected sounds;

a transmission line attached to said video camera, said transmission line suitable for carrying said digitized signal;

a video monitor in communication with said trsssion line, said video monitor being configured to receive a signal corresponding to said digitized signal representative of said downhole images, said video monitor in response broadcasting a visual presentation; and a speaker suitable in communication with said transmission line, said speaker being configured to receive a signal from said transmission line corresponding to said electrical signal, said speaker in response broadcasting an audio presentation.

14. The video system of claim 13, wherein said digital video compressor is configured to use wavelet compression.

15. The video system of claim 13, further comprising:

a digital video decompress configured to attach to said digital video compressor, said video decompress being suitable for receipt of said compressed form of said digitized signal and further suitable for subsequent generation of a second digitized signal, wherein said digital video compressor is configurable to utilize lossy image compression and said second digitized signal is in a decompressed form, said second digitized signal corresponding to a selected compression ratio, a selected frame rate, and a selected number of pixels;

a microprocessor suitable for attachment to said transmission line; and controls suitable for attachment to said microprocessor, said controls for adjusting amongst said selected compression ratio, said selected frame rate, and said selected number of pixels to obtain a selected balance.

16. The video system of claims 13, wherein said sound sensor detects ambient sounds and wherein said audio presentation corresponds to said ambient sounds.

17. The video system of claim 13, further comprising:

a sound sensor suitable for insertion in a wellbore and configured to detect sounds, said sound sensor suitable for subsequent generation of an electrical sound signal representative of said detected sounds;

a multiplexer attached between said digital video compressor and said sound sensor, said multiplexer configured to multiplex said electrical sound signal and said digitized signal.

18. The video system of claim 17, wherein said sound sensor is a microphone.

19. The video system of claim 13, further comprising:

an orientation sensor configured to generate an orientation data signal, and suitable for insertion in said well bore, said orientation sensor being configured to attach to said digital video compressor.

20. The video system of claim 19, further comprising:

a digital video decompress configured to attach to said digital video compressor, said video decompress being suitable for receipt of said compressed form of said digitized signal and further suitable for subsequent generation of a second digitized signal, said second digitized signal being in a decompressed form, wherein said digital video compressor is configurable to utilize lossy image compression;

an image rotation processor attached to said digital video decompress, said image rotation sensor being programmable to combine said digitized signal and said orientation signal for video presentation; and a video monitor attached to said image rotation processor.

21. The video system of claim 20, further comprising:

a multiplexer suitable for attachment to said digital video compressor and to said orientation sensor, said multiplexer being configured to multiplex said orientation data signal and said digitized signal, and thereafter provide a multiplexed signal comprising said orientation data signal and said digitized signal;

a demultiplexer suitable for attachment to said digital video decompress and suitable for reception of said multiplexed signal, said demultiplexer configured to demultiplex said multiplexed signal into said orientation data signal and said digitized signal.

* * * * *